Jan. 1, 1924.
E. A. SPERRY
1,479,630
COOLING MOTION PICTURE PROJECTORS AND FILMS
Filed April 13, 1920   2 Sheets-Sheet 1
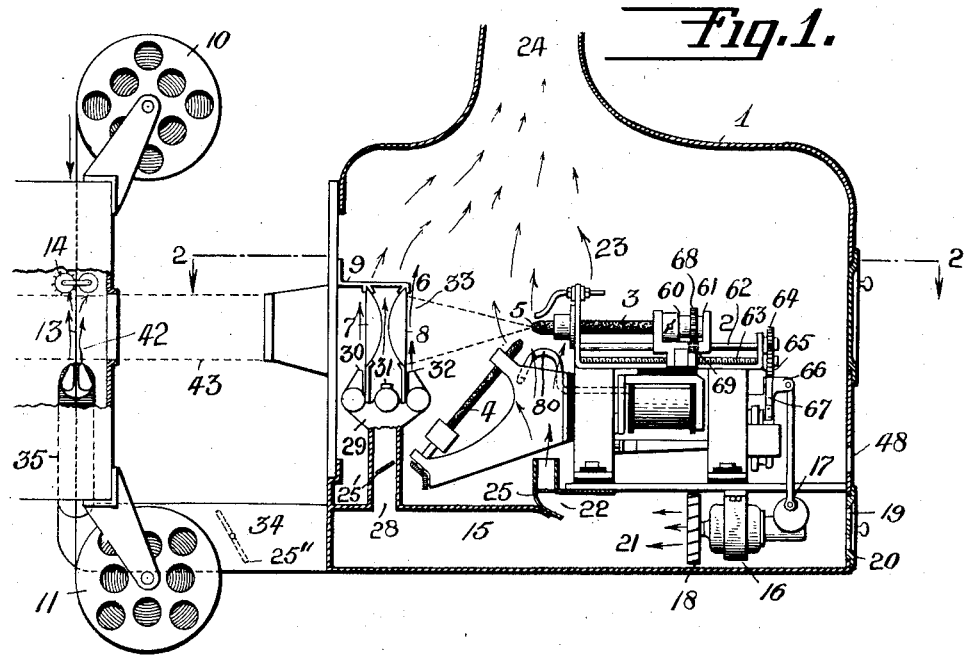
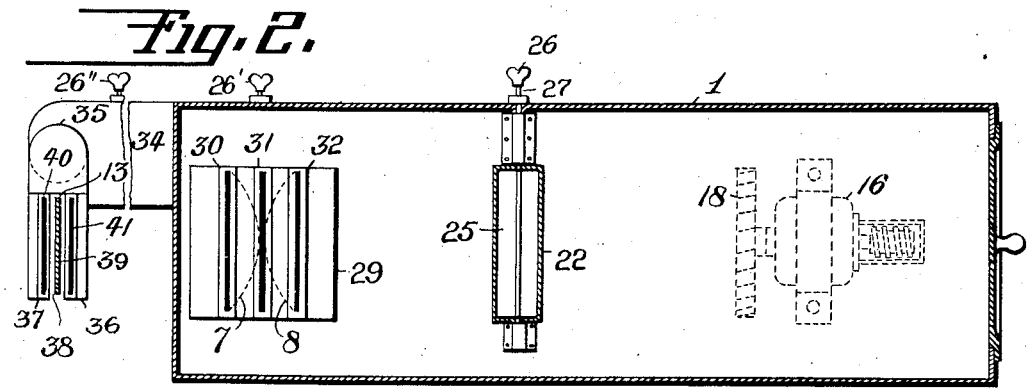
INVENTOR
ELMER A. SPERRY.
BY
Herbert H. Thompson
HIS ATTORNEY

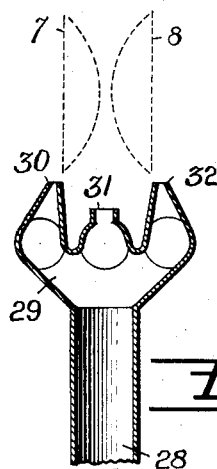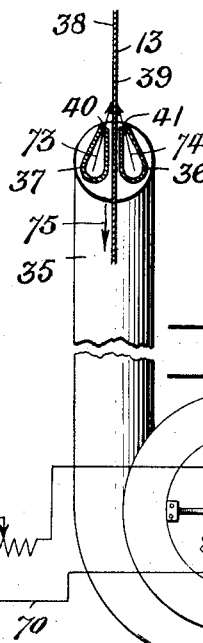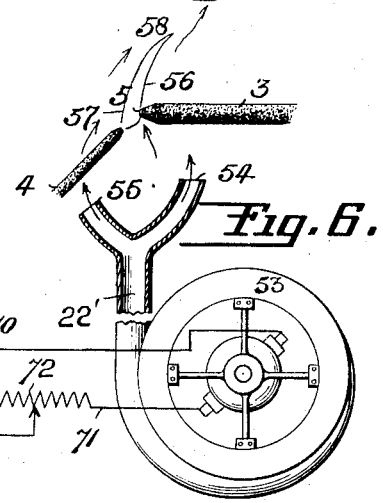

Patented Jan. 1, 1924.

1,479,630

UNITED STATES PATENT OFFICE.

ELMER A. SPERRY, OF BROOKLYN, NEW YORK.

COOLING MOTION-PICTURE PROJECTORS AND FILMS.

Application filed April 13, 1920. Serial No. 373,496.

*To all whom it may concern:*

Be it known that I, ELMER A. SPERRY, a citizen of the United States of America, residing at 1505 Albemarle Road, Brooklyn, in the county of Kings and State of New York, have invented certain new and useful Improvements in Cooling Motion-Picture Projectors and Films, of which the following is a specification.

This invention relates to motion picture projecting apparatus, and more specifically to the cooling and ventilation of certain parts of the apparatus.

In motion picture machines in general the light source is not of very high power, and consequently the heat emanating therefrom is not of great intensity. But in all machines to some extent and especially the higher class machines used for long range projecting and high quality reproduction, the heat produced by the light source is more or less of a problem and not infrequently causes damage to the lens systems and other parts of the apparatus as well as to the films. The problem obviously becomes more important as the type of light source is improved and especially so where the highest known types of artificial light, such as the high or semi-high intensity arc light, as shown in the patents to Sperry No. 1,227,210 and Bassett No. 1,328,311 are used.

The object of the invention is to devise a method and means for automatically and effectively ventilating the lamp house and cooling the mechanism, the lenses and the portion of the film passing through the light beam, of all high power projectors and especially high intensity projectors of the type described.

Referring to the drawings wherein I have shown what I now consider to be the preferred form of my invention:

Fig. 1 is a sectional side elevation of a lamp house showing the embodiment of my invention.

Fig. 2 is a section taken on line 2—2, Fig. 1, parts of the mechanism being omitted for the sake of more clearly showing the ventilating and cooling system.

Fig. 3 is a detail of the condenser cooler, showing also a separate source of air supply.

Fig. 4 is a similar detail of the film cooler.

Fig. 5 is a modification showing one method of supplying cooling air to the film.

Fig. 6 is a modification of the lamp ventilating blower.

In Fig. 1 the lamp house is shown at 1, and contains the lamp mechanism 2 and the positive and negative electrodes 3 and 4. The positive electrode is gripped by a sleeve 60 rotatably held by a carriage 61, said carriage being slidably mounted on a guide rod 62 and in threaded engagement with screw rod 63. Rod 62 may carry a gear 64 meshing with gear 65 on rod 63. A reciprocating member 66 actuated by motor 16 may have a pawl 67 to engage and rotate gear 65 and thus rotate rods 62, 63. Rotation of rod 63 will effect the feeding of electrode 3, while rotation of rod 62 will through pinion 68 meshing with gear 69 effect rotation of said electrode. A more detailed disclosure of the foregoing mechanism is contained in the copending application of Theodore Hall, Serial No. 377,743, for motion picture projectors, filed Apr. 30, 1920. The principal light emanates from the crater 5 of the positive electrode, and as shown is entirely unobstructed in its passage to the condenser 6. Said condenser may obviously comprise any desired form, but is shown here in the most usual form, i. e. a pair of oppositely disposed plano-convex lenses 7, 8, carried by a suitable holder 9 attached to the lamp house. 10 and 11 represent the dispensing and receiving reels for the film 13 which is guided and actuated by mechanism represented at 14.

Below the lamp house 1 I may provide an air passage or chamber 15, within one end of which may be positioned the motor 16 connected by suitable means 17 to the lamp mechanism for operating the same as set forth. A fan 18 is shown also actuated by said motor for drawing air in through opening 19 which may be provided with a regulating door 20, and forcing said air in the direction of arrows 21. In the top of chamber 15, below the light source 5 I may provide an opening 22 for permitting a current of air to sweep upwardly adjacent the light source and arc flame and around the heated portions of the lamp mechanism as indicated by arrows 23 for cooling the mechanism and carrying the fumes and heat produced by the arc out of the lamp house through an opening or chimney 24, which may lead out through the wall or ceiling 49 (see Fig. 5) of the room and out of doors if desired. Preferably the air currents should not come in contact with the arc flame, as otherwise unsteadiness of said flame may result. Also it is desirable that the air currents be kept out of contact with the arcing tips of the electrodes, as the temperature of the latter should be kept as high as possible in order to obtain the maximum light. For preventing the currents of air from contacting with the arc flame and the adjacent electrode tips a baffle or suitable plate 80 may be positioned opposite passage 22. As shown in Fig. 2, said baffle plate 80 is positioned so as to intercept the currents which would otherwise sweep into contact with said arc flame and electrode tips. While the baffle 80 is sufficiently wide to obstruct the air currents from the arc, it is narrower than the opening 22, and the air currents are permitted to pass upwardly on each side thereof, as indicated by the arrows. A shutter 25 may be provided for the opening 22, so that the force of the air blast may be regulated. Actuation may be effected through a knob 26 on rod 27 to which said shutter is attached. Obviously the air being drawn in by fan 18 will, by passing over and through motor 16, serve to keep the said motor cool.

For cooling the condenser, I have shown a conduit 28 connected with air chamber 15, and branching outwardly at 29 and having a plurality of outlets 30, 31, 32. These outlets may be long narrow slots as shown in Fig. 2; the slots being preferably substantially equal in length to the width of the lenses 7 and 8 and being so positioned that air issuing therefrom will sweep upwardly over the several surfaces of said lenses as indicated by arrows 33. A shutter 25. actuated through thumb nut 26′ may be provided for regulating the flow of air over the lenses. The air blasts for the lenses and for the light fumes and light mechanism will also supply a considerable current of cooling air for the space between the light source and condenser. Additional openings 48 may be provided around the housing 1 for permitting air to be drawn in and upward through the chimney 24 for general ventilation and cooling.

Another conduit may be provided as shown leading outwardly as at 34 and upwardly as at 35, adjacent to one edge of the film 13 as seen in Fig. 2. Branches 36, 37 reaching laterally adjacent the opposite faces 38, 39 of the film are provided with slots 40, 41 so positioned as to direct parallel currents of air over the opposite faces of the film as indicated by arrows 42 where said film passes through the light beam 43. As shown in Fig. 4 the slots 40, 41 are so arranged that the air issuses therefrom in the direction represented by arrows 73, 74, so that the air actually impinges the surfaces of the film with considerable force as indicated, and sweeps over said surfaces in the direction opposite to the direction of movement of said film as represented by arrow 75. In this way the heat absorbed by the film and especially by the darker sections of the emulsion will be vigorously extracted, thus preventing the film from becoming hot enough to be damaged. The flow of air upon the film may be regulated by means of a shutter 25″, actuated through a thumb nut 26″.

In Fig. 3 I have shown a modification wherein the air for cooling the condenser lenses 7, 8 may be supplied by an independent source, such as a blower 44 actuated by a motor 45. Said blower may be connected directly with conduit 28.

A modification in connection with the cooling of the film is shown in Fig. 4 wherein a separate blower 46 actuated by a motor 47 may be connected directly to conduit 35.

Fig. 6 represents a separate blower 53 for furnishing the air blast for the opening 22′ to carry off the products of combustion. In this view, one or two jets 54, 55 may be employed for causing the air to pass by one side 56 or the other side 57 of flame 58, or both sides. With this construction it will be seen that the air is directed upon portions of the electrodes distant from the arcing tips thereof. At the same time the air currents pass sufficiently near the arc flame to withdraw fumes from the arc without, however, causing flickering of the flame.

Higher air pressure may be maintained by the use of separate blowers for the purpose of more intensive cooling. Obviously the speed of the blowers may be varied to obtain any desired air pressure. For this purpose each of the blowers 44, 46, and 53 is shown as adapted to be supplied with current through wires 70, 71; a rheostat 72 being included in the circuit so as to vary the current.

In Fig. 5 I have shown another modification. In motion picture projectors the lamp house 1 is frequently constructed as a separate unit from the portion 50 which carries the film, and is movable with respect thereto, as for instance on a track 51. In such machines, where the one fan 18 on motor 16 is used to supply all of the cooling air, a flexible conduit 52 may be connected between the air chamber 15 and the portion 50 to supply the air for the cooling of the film. Adjustment of the lamp house may thus be made without interfering with the supply of air for the film.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a motion picture projecting apparatus, means for carrying a film, and means for directing parallel currents of a cooling fluid against opposite sides of the film and longitudinally.

2. In a motion picture projecting apparatus, a light source, a lens associated therewith, and means for causing concentrated unidirectional currents of cooling fluid to pass over both surfaces of said lens.

3. In a motion picture projecting apparatus, a lamp house, a lamp within said house, means for actuating said lamp, said means being also adapted to produce a current of air, and means for directing said air through said lamp house for ventilating the same.

4. In a motion picture projector, a light source, a condenser associated therewith, means for positioning a film in predetermined relationship to said condenser and source, a fluid conductor having vents located adjacent said source, said condenser, and said positioning means for supplying a cooling fluid to the source, condenser and film, and means for charging said conductor with a cooling fluid.

5. In a motion picture projector, a lamp house adapted to contain a light source, an optical lens system associated with said house, film positioning means, an air conduit, means for supplying air under pressure to said conduit, said conduit being provided with outlets adjacent said light source, said lenses, and said positioning means, the outlet adjacent the lenses being adapted to direct a current of air over the several surfaces of said lenses and the outlet adjacent the positioning means being adapted to direct a current of air over the opposite surfaces of a film.

6. In a motion picture projecting apparatus, means for positioning a film, means for producing a current of air, and means for directing said air against the film for intensely cooling the same, said directing means being so positioned that the air issuing therefrom will move over the film in the direction opposite to the movement of the film and parallel thereto.

7. In a motion picture projecting apparatus, a housing, arc light mechanism within said housing, means for producing a current of air, means for directing said air adjacent said mechanism for ventilating said housing, and means for preventing said air current from contacting with the arc flame.

8. In a motion picture projecting apparatus, arc light mechanism, a housing therefor, means for drawing air through said housing and means for directing said air adjacent the arc flame but out of contact therewith.

9. In a motion picture projecting apparatus, arc light mechanism including a pair of electrodes, a housing for said mechanism, means for producing an air current and means for directing said current adjacent said electrodes at a distance from the arcing tips thereof.

In testimony whereof I have affixed my signature.

ELMER A. SPERRY.